(12) United States Patent
Kuebel

(10) Patent No.: US 8,297,126 B2
(45) Date of Patent: Oct. 30, 2012

(54) INTEGRATION OF STRAIN GAUGES AT INNER- AND OUTER LINER OF A HIGH PRESSURE TANK TO INDICATE DISCHARGE LIMIT POINT

(75) Inventor: Christoph Kuebel, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 359 days.

(21) Appl. No.: 12/797,485

(22) Filed: Jun. 9, 2010

(65) Prior Publication Data

US 2011/0303017 A1 Dec. 15, 2011

(51) Int. Cl.
*G01L 9/04* (2006.01)
(52) U.S. Cl. .............................. 73/720; 73/726
(58) Field of Classification Search .................. None
See application file for complete search history.

(56) References Cited

U.S. PATENT DOCUMENTS 2,372,800 A * 4/1945 Stearns .......................... 220/586
5,522,428 A * 6/1996 Duvall ...................... 137/624.11

* cited by examiner

*Primary Examiner* — Andre Allen
(74) *Attorney, Agent, or Firm* — John A. Miller; Miller IP Group, PLC

(57) ABSTRACT

A high pressure tank that has particular application for storing hydrogen gas on a vehicle for a fuel cell system. The tank includes a gas tight inner liner layer and a fiber bundle outer composite structural layer. A first strain gauge is provided in the outer layer and a second strain gauge is provided in the inner liner layer both proximate a transition between the layers. The strain gauges are calibrated relative to each other to identify the pressure where the inner liner layer begins to shrink and separate from the outer composite layer.

20 Claims, 2 Drawing Sheets

INTEGRATION OF STRAIN GAUGES AT INNER- AND OUTER LINER OF A HIGH PRESSURE TANK TO INDICATE DISCHARGE LIMIT POINT

BACKGROUND OF THE INVENTION

1. Field of the Invention

This invention relates generally to a high pressure tank and, more particularly, to a high pressure tank including an outer fiber composite layer having a first strain gauge and an inner liner layer having a second strain gauge, where the first and second strain gauges identify a pressure where the inner liner layer begins to shrink and separate from the outer layer.

2. Discussion of the Related Art

Hydrogen is a very attractive fuel because it is clean and can be used to efficiently produce electricity in a fuel cell. The automotive industry expends significant resources in the development of hydrogen fuel cell systems as a source of power for vehicles. Such vehicles would be more efficient and generate fewer emissions than today's vehicles employing internal combustion engines.

Typically hydrogen gas is stored in a compressed gas tank under high pressure on the vehicle to provide the hydrogen necessary for the fuel cell system. The pressure in the compressed tank can be 700 bar or more. In one known design, the compressed tank includes an inner plastic liner that provides a gas tight seal for the hydrogen gas, and an outer carbon fiber composite layer that provides the structural integrity of the tank. At least one pressure regulator is typically provided that reduces the pressure of the hydrogen gas within the tank to a pressure suitable for the fuel cell system.

If the pressure within the tank falls below a certain value, the inner liner layer may begin to shrink and separate from the outer layer. This separation could cause inner liner damage and loss of leak tightness, and thus must be avoided. A current solution to avoid this separation is to maintain a high of enough pressure within the tank to prevent inner liner layer shrinkage. For current tank designs, a minimum pressure of 20 bar must be maintained in the tank to prevent the inner liner layer from shrinking and separating from the outer structural layer.

Pressure sensors are provided within the tank to provide a measurement of the pressure within the tank. Because the pressure sensors employed in these types of tanks need to provide a reasonably accurate pressure measurement over a range of about 1000 bar, and they need to be relatively inexpensive, they typically have an accuracy of about 1.5%, which gives an accuracy of +/−15 bar. Further, considering the measurement requirements of the sensor wiring over the entire temperature range that the tank may encounter typically provides a measurement accuracy of +/−35 bar, which is added to the 20 bar to provide the desired safety margin. Thus, hydrogen discharge from the tank needs to be stopped at a tank pressure sensor reading of about 55 bar resulting in about 5% of the hydrogen gas within the tank not being usable for vehicle operation.

SUMMARY OF THE INVENTION

In accordance with the teachings of the present invention, a high pressure tank is disclosed that has particular application for storing hydrogen gas on a vehicle for a fuel cell system. The tank includes a gas tight inner liner layer and a fiber bundle outer composite structural layer. A first strain gauge is provided in the outer layer and a second strain gauge is provided in the inner liner layer both proximate a transition between the layers. The strain gauges are calibrated relative to each other to identify the pressure where the inner liner layer begins to shrink and separate from the outer composite layer.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a high pressure tank system including strain gauges that identify a separation point between a gas tight inner liner layer and an outer composite structural layer is merely exemplary in nature, and is in no way intended to limit the invention or its applications or uses. For example, the discussion below describes the invention as having particular application for storing hydrogen gas on a vehicle for a fuel cell system. However, as well be appreciated by those skilled in the art, the present invention will have application for other types of high pressure tanks for storing other types of gases that have inner gas tight layers and outer structural layers.

Figure 1:
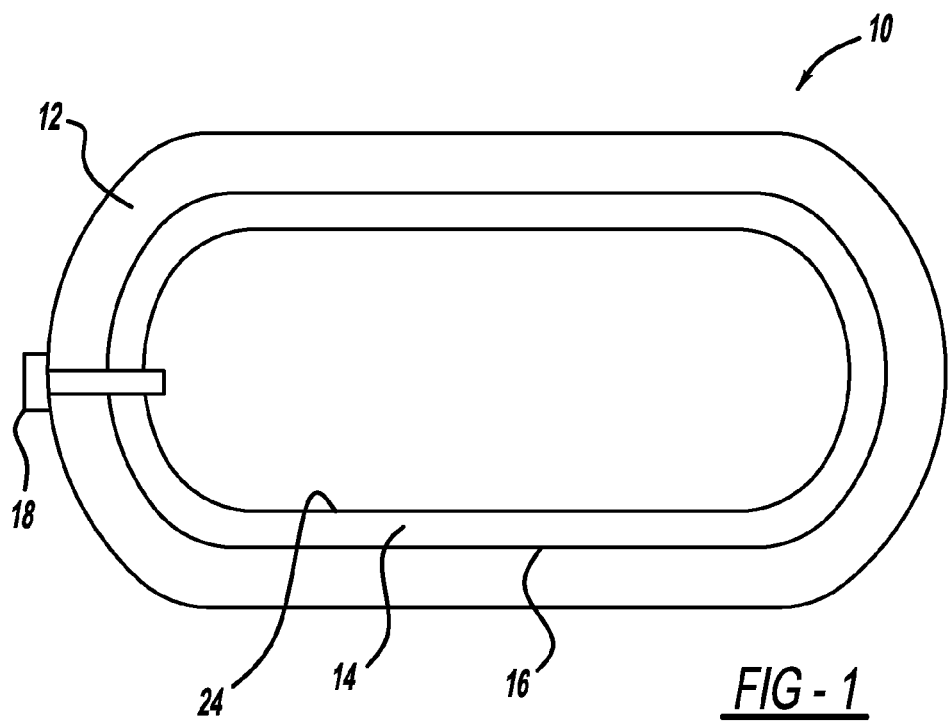
FIG. 1 is a cross-sectional view of a compressed hydrogen gas tank.

FIG. 1 is a cross-sectional view of a compressed hydrogen storage tank 10 of the type discussed above. The tank 10 includes an outer structural layer 12, typically including carbon fiber composite bundles to provide the structural integrity, and an inner liner 14, typically made of a durable molded plastic, such as a high density polyethylene, defining a transition 16 between the layer 12 and the liner 14. The liner 14 provides the gas tight environment for the hydrogen gas, and the outer layer 12 provides the structural integrity for the compressed hydrogen gas. The tank 10 includes an adaptor 18 in an opening extending through the outer structural layer 12 and the inner liner 14 that provides access to the inside of the tank 10 for filling the tank 10 and removing gas from the tank 10 in a manner that is well understood to those skilled in the art.

Figure 3:
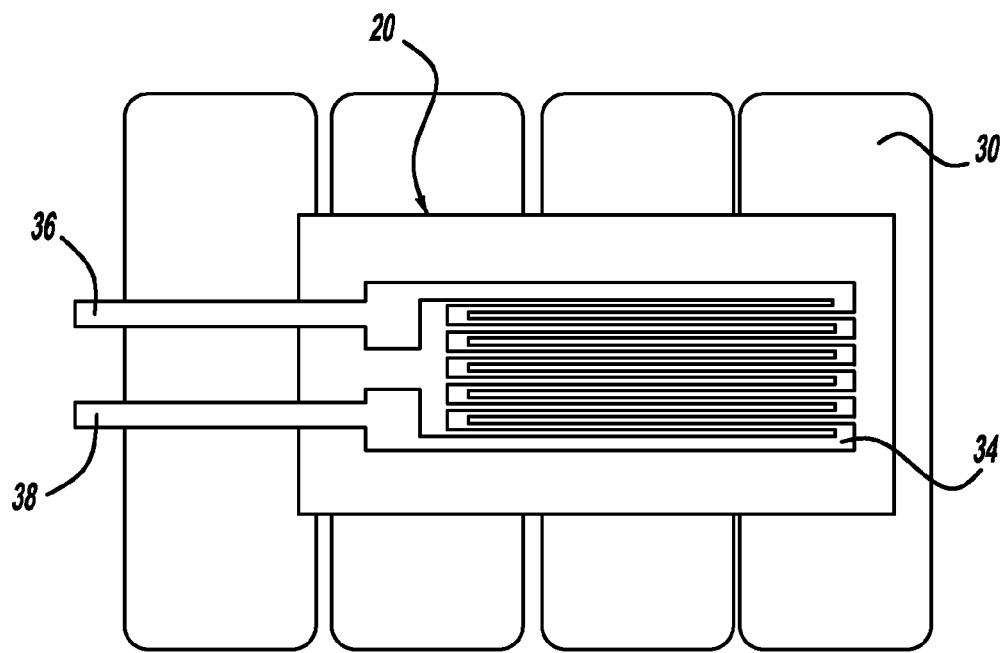
FIG. 3 is a top view of one of the strain gauges shown in FIG. 2.
Figure 2:
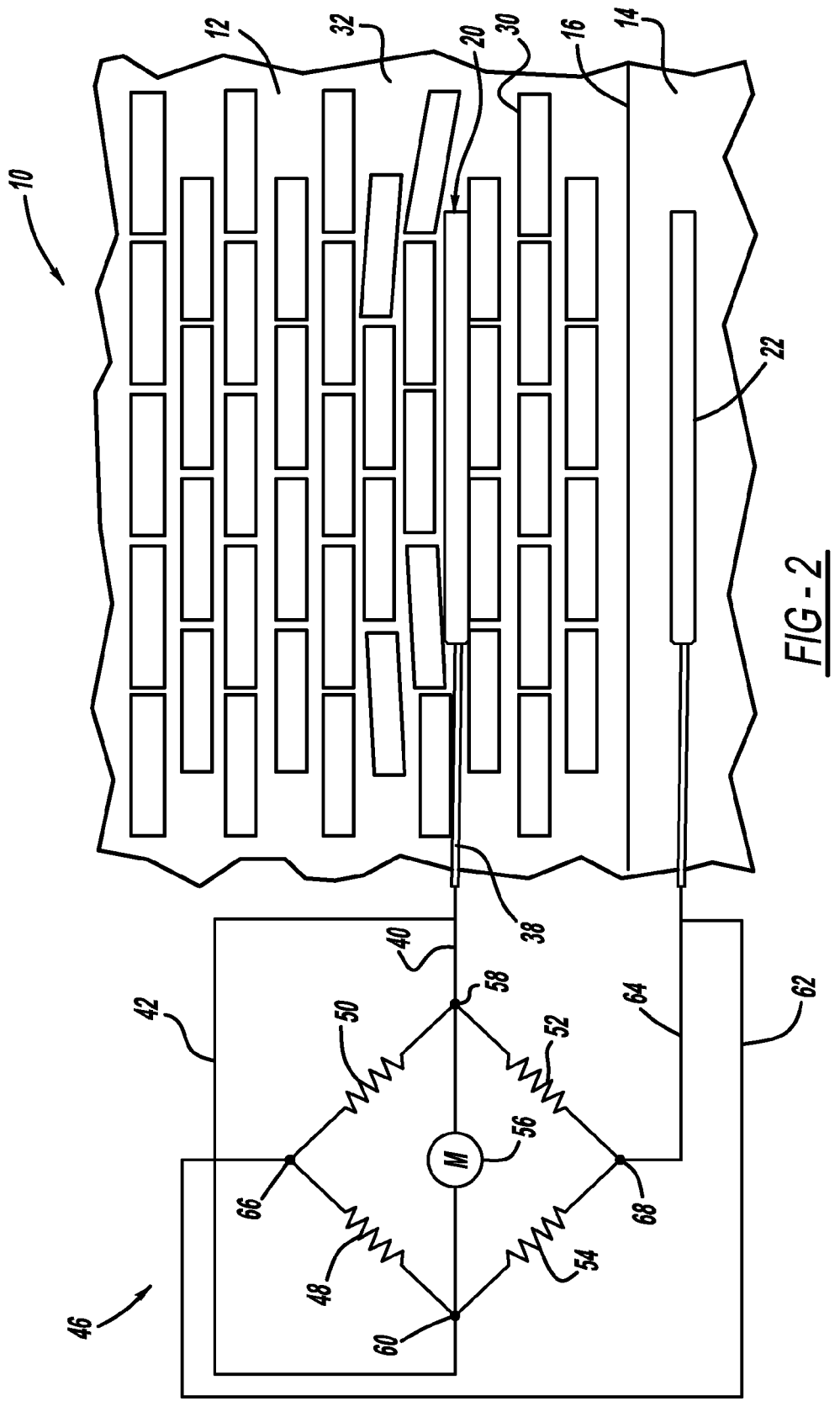
FIG. 2 is a cut-away portion of the tank shown in FIG. 1 showing a first strain gauge in an outer structural layer and a second strain gauge in an inner liner layer.

The tank 10 includes a first strain gauge 20 provided in the outer structural layer 12 and a second strain gauge 22 provided in the inner liner 14. FIG. 2 is a cut-away portion of the tank 10 showing the strain gauges 20 and 22 being positioned proximate the transition 16 between the outer structural layer 12 and the inner liner 14. FIG. 3 is a top view of the strain gauge 20. The strain gauges 20 and 22 can be provided at any suitable location around the circumference of the tank 10 as long as the strain gauges 20 and 22 are positioned relative to each other. Further, the strain gauges 20 and 22 can have any configuration suitable for the purpose described herein, and can have any suitable length, such as 30 cm.

The outer structural layer 12 includes a series of parallel rows of composite fibers 30 formed in a laminate resin 32. The strain gauge 20 is provided between two rows of the fibers 30 within the laminate resin 32 in such a manner that it is rigidly fixed therein, where the length of the strain gauge 20 is generally perpendicular to the length of the fibers 30 and will not change. Further, the strain gauge 20 includes a wound metal strip 34 having two end sections 36 and 38 and being made of a material whose resistance changes significantly in response to small changes in its length, as is well understood by those skilled in the art. The strain gauge 20 includes two wires 40 and 42 attached to the end sections 36 and 38, respectively, of the strip 34, which run along the outer structural layer 12 and out of the tank 10 through the adapter 18. The strain gauge 22 is formed in the liner 14 when it is molded and would be of the same design as the strain gauge 20.

The strain gauges 20 and 22 can be of a significant sensing length, such as 30 cm, to increase their sensitivity and are generally not susceptible to temperature fluctuations because the stain gauges 20 and 22 would be at the same temperature. When the liner 14 begins to shrink because of the pressure within the tank 10 is too low, the length of the strain gauge 22 will change, which will provide a change in the output of the strain gauge 22. Because the layer 12 is rigid, the length of the strain gauge 20 will not change, so the relative difference in the outputs between the strain gauges 20 and 22 can be used to identify when the liner 14 begins to shrink, and thus, when the tank 10 needs to be shut-off.

A Wheatstone bridge 46 can be used to determine a balance between the strain gauges 20 and 22 to determine when to shut off the tank 10 as discussed above. The Wheatstone bridge 40 includes four resistors 48, 50, 52 and 54 electrically connected in the normal configuration and a voltage meter 56. The wires 40 and 42 are coupled to opposing nodes 58 and 60, respectively, of the Wheatstone bridge 46, and wires 62 and 64 of the strain gauge 22 are coupled to opposing nodes 66 and 68, respectively, of the Wheatstone bridge 40, as shown. The value of the resistors 48, 50, 52 and 54 are selected so that the Wheatstone bridge 46 is balanced and calibrated to provide a set value, such as zero, of the strain between the strain gauges 20 and 22 when the liner 14 is tight against the inside surface of the structural layer 12.

When the tank 10 is filled with gas to a pressure of 20 bar, i.e., the pressure where separation occurs, using a highly accurate pressure sensor, such as at a gas filling station, the Wheatstone bridge 40 is zeroed to the balance value. As long as the pressure within the tank 10 is above 20 bar the liner 14 does not shrink and remains tight against the inside of the outer structural layer. The length of the strain gauges 20 and 22 will remain the same, and the output of the Wheatstone bridge 46 will stay at its calibrated value. If the pressure within the tank 10 falls below 20 bar, where the liner 14 begins to shrink, the length of the strain gauge 20 which is rigidly fixed within the structural layer 12 stays the same, but the length of the strain gauge 22 is reduced by the shrinkage. This creates an un-balance in the Wheatstone bridge 46 provided by the resistors 48, 50, 52 and 54, which is measured by the sensor 56. This measurement can be detected, and appropriate algorithms can be preventing that turn the tank 10 off providing further shrinkage of the liner 14. Thus, more hydrogen gas can be used from the tank 10 than was able to previously be used.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A high pressure tank assembly comprising:
    an outer structural layer;
    an inner liner layer positioned within the outer structural layer and providing a gas tight environment;
    a first strain gauge provided within the outer structural layer; and
    a second strain gauge provided within the inner liner layer, said first and second strain gauges defining a separation point where the inner liner layer separates from the outer structural layer caused by shrinking of the inner liner layer at low pressure.

2. The tank assembly according to claim 1 wherein the outer layer includes rows of parallel fibers configured within a laminate resin.

3. The tank assembly according to claim 2 wherein the first strain gauge is positioned between two rows of parallel fibers within the resin.

4. The tank assembly according to claim 2 wherein a length of the first strain gauge is perpendicular to a length of the fibers.

5. The tank assembly according to claim 2 wherein the fibers are carbon fibers.

6. The tank assembly according to claim 1 wherein the first and second strain gauges are positioned proximate a transition between the structural layer and the inner liner layer.

7. The tank assembly according to claim 1 wherein the first and second strain gauges have a length of about 30 cm.

8. The tank assembly according to claim 1 wherein the inner liner layer is a plastic layer.

9. The tank assembly according to claim 1 wherein the first strain gauge and the second strain gauge each include a pair of wires where the wires are electrically coupled to a Wheatstone bridge that determines a balance between the first and second strain gauges.

10. The tank assembly according to claim 1 wherein the tank assembly is a hydrogen gas tank assembly.

11. The tank assembly according to claim 10 wherein the tank assembly is part of a fuel cell system on a vehicle.

12. A high pressure tank assembly for storing hydrogen gas, said tank assembly comprising:
    an outer structural layer including rows of parallel fibers configured within a laminate resin;
    an inner plastic liner layer positioned within the outer structural layer and providing a gas tight environment for holding the hydrogen gas;
    a first strain gauge positioned within the outer structural layer between two rows of parallel fibers within the resin where a length of the first strain gauge is perpendicular to a length of the fibers; and
    a second strain gauge molded within the inner plastic liner layer, said first and second strain gauges defining a separation point, where the inner liner layer separates from the outer structural layer caused by shrinking of the inner liner layer at low pressure.

13. The tank assembly according to claim 12 wherein the fibers are carbon fibers.

14. The tank assembly according to claim 12 wherein the first and second strain gauges are positioned proximate a transition between the structural layer and the inner liner layer.

15. The tank assembly according to claim 12 wherein the first and second strain gauges have a length of about 30 cm.

16. The tank assembly according to claim 12 wherein the first strain gauge and the second strain gauge each include a pair of wires where the wires are electrically coupled to a Wheatstone bridge that determines a balance between the first and second strain gauges.

17. The tank assembly according to claim 12 wherein the tank assembly is part of a fuel cell system on a vehicle.

18. A high pressure tank assembly comprising:
    an outer structural layer;

an inner liner layer positioned within the outer structural layer and providing a gas tight environment;

a first strain gauge provided within the outer structural layer and rigidly affixed therein;

a second strain gauge provided within the inner liner layer and having a length that changes in response to shrinkage of the inner liner layer; and a Wheatstone bridge electrically coupled to the first and second strain gauges, said Wheatstone bridge providing an indication where the inner liner layer separates from the outer structural layer as a result of shrinking of the inner liner layer at low pressure.

19. The tank assembly according to claim 18 wherein the outer layer includes rows of parallel fibers configured within a laminate resin, and wherein the first strain gauge is positioned between two rows of parallel fibers within the resin.

20. The tank assembly according to claim 18 wherein the first and second strain gauges are positioned proximate a transition between the structural layer and the inner liner layer.

* * * * *